United States Patent [19]

Brydges, III et al.

[11] 4,059,425
[45] Nov. 22, 1977

[54] GASEOUS PROCESS FOR HYDRATING AND EXTRUDING GLASS

[75] Inventors: William T. Brydges, III; Edwin J. Illig, both of Corning, N.Y.

[73] Assignee: Corning Glass Works, Corning, N.Y.

[21] Appl. No.: 678,930

[22] Filed: Apr. 21, 1976

Related U.S. Application Data

[63] Continuation of Ser. No. 542,233, Jan. 20, 1975, abandoned.

[51] Int. Cl.² .......... C03C 19/00; C03C 15/00; C03B 31/00; C01B 33/32
[52] U.S. Cl. .......... 65/22; 65/30 R; 65/134; 65/32; 23/272.6 A; 423/332; 106/74
[58] Field of Search .......... 423/332; 65/22, 32, 65/30 R, 134, 27; 23/272.6 A, 272.6 B; 106/74

[56] References Cited

U.S. PATENT DOCUMENTS

| 1,763,845 | 6/1930 | Edgerton | 23/272.6 A |
|---|---|---|---|
| 2,251,515 | 8/1941 | Curll, Jr. | 423/332 X |
| 2,264,246 | 11/1941 | Lytle | 65/22 X |
| 3,498,802 | 3/1970 | Bickford et al. | 65/32 X |
| 3,782,906 | 1/1974 | Pierce | 423/332 X |
| 3,912,481 | 10/1975 | Bartholomew et al. | 65/30 R |
| 3,948,629 | 4/1977 | Bartholomew et al. | 65/30 R |
| 3,960,532 | 6/1976 | Lazet | 65/134 X |
| 3,961,022 | 6/1976 | Pierce | 423/332 |

FOREIGN PATENT DOCUMENTS 4,021 of 1890 United Kingdom .......... 23/272.6 A

Primary Examiner—S. Leon Bashore
Assistant Examiner—Frank W. Miga
Attorney, Agent, or Firm—Clinton S. Janes, Jr.; Clarence R. Patty, Jr.

[57] ABSTRACT

The present invention relates to a process and apparatus useful therein for steam hydrating alkali silicate glass materials and subsequently extruding the hydrated material. There need be no moving parts in the hydration apparatus since the process can utilize the pressure of steam to both hydrate the glass and extrude it from the hydration chamber. The process permits the formation of solid extrusions or foam extrusions.

1 Claim, 3 Drawing Figures

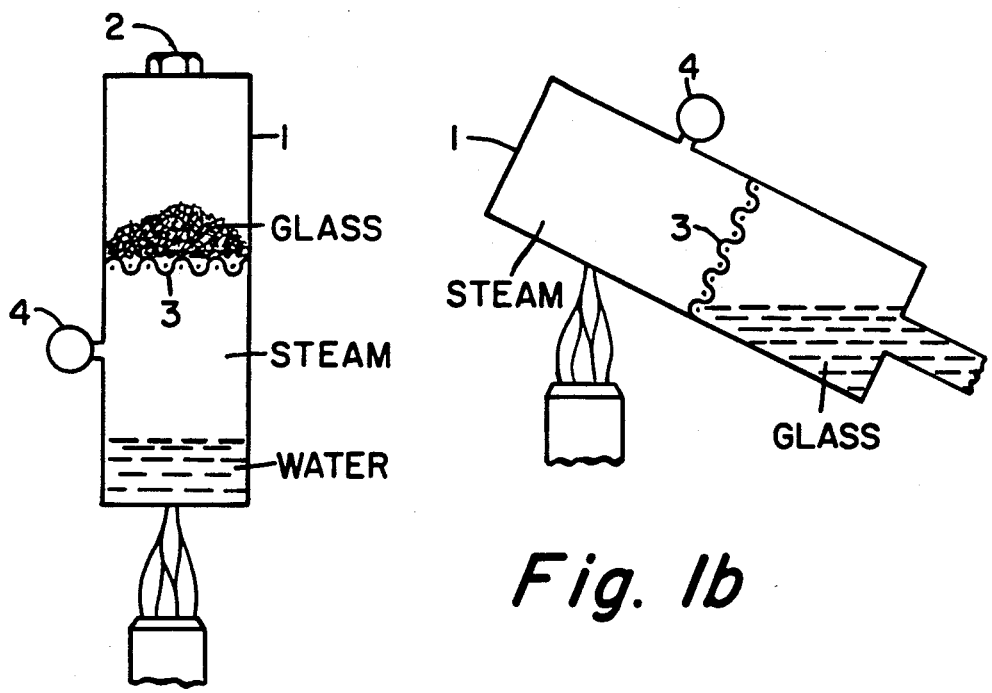
Fig. 1a
Fig. 1b
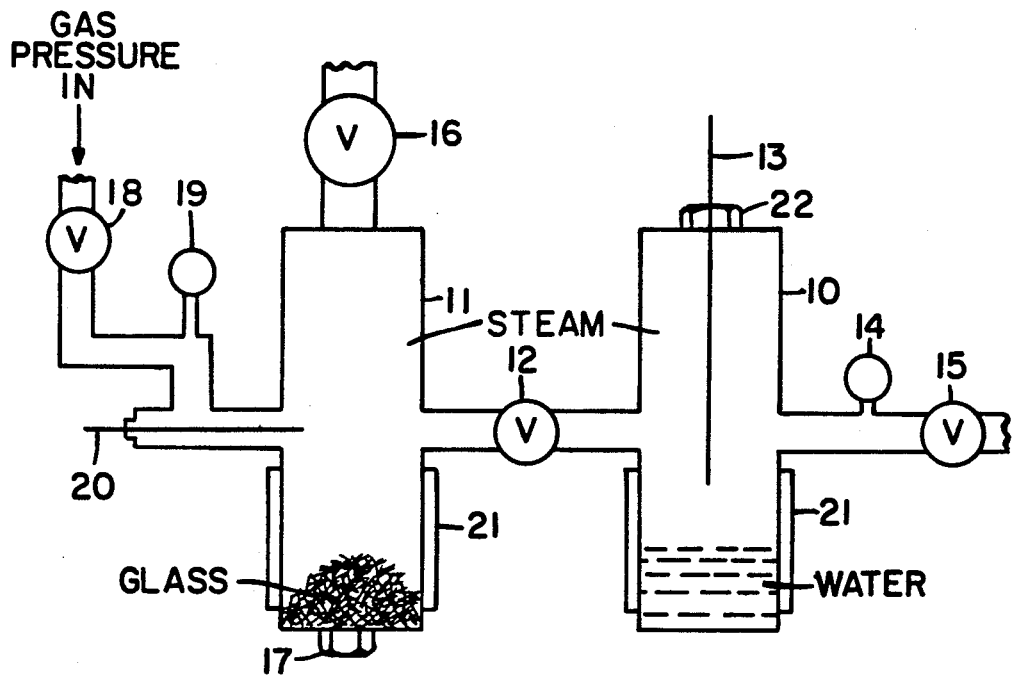
Fig. 2

GASEOUS PROCESS FOR HYDRATING AND EXTRUDING GLASS

This is a continuation of application Ser. No. 542,233, filed Jan. 20, 1975 now abandoned.

The hydration of alkali metal-containing silicate glass particles utilizing treatment in steam atmospheres at elevated temperatures and pressures has been described extensively in both the academic and patent literature. For example, U.S. Pat. No. 3,498,802 describes the steam treatment of glass powders consisting essentially, in mole percent on the oxide basis, of about 80–94% $SiO_2$ and 6–20% $Na_2O$ and/or $K_2O$, the total of those components constituting at least 90% of the composition. The steam treatment imparts thermoplastic properties to the powders and, under certain conditions, can yield products demonstrating the behavior of a hydraulic cement. Whereas $Al_2O_3$, BaO, $B_2O_3$, MgO, PbO, and ZnO are suggested as possible optional additions, CaO and $Li_2O$ are preferably to be avoided.

The hydration process involved contacting the glass powders with a gaseous environment containing at least 50% by weight steam at a pressure of at least one atmosphere and at a temperature customarily between about 100°–200° C. The steam treatment caused $H_2O$ to penetrate into the glass structure such that the powders absorbed a water content up to about 30% by weight.

U.S. application Ser. No. 445,454, filed Feb. 25, 1974, discloses a method especially designed for producing fine-dimensioned, hydrated alkali metal silicate glass bodies demonstrating thermoplasticity and other physical characteristics comparable to those of high polymer organic plastics. The method contemplates a specifically-defined, single-step steam hydration of glass bodies having thickness dimensions not exceeding about 15 mm. Suitable glasses consist essentially, in mole percent on the oxide basis, of about 3–25% $Na_2O$ and/or $K_2O$ and 50–95% $SiO_2$, the total of those components constituting at least 55% of the composition. $Al_2O_3$, BaO, $B_2O_3$, CaO, CdO, MgO, PbO, $ZrO_2$, $WO_3$, $MoO_3$, $TiO_2$, SrO, and ZnO are specifically suggested as operable optional additives. Thus, PbO, CaO, ZnO, and $B_2O_3$ are useful in amounts up to about 25%, MgO is operable up to about 35%, and BaO and $Al_2O_3$ are effective up to about 15%. Individual amounts of other optional metal oxides will preferably be held below about 10%.

The method involves steam hydration in environments of relatively low $H_2O$ content or, in special compositional variations, at greater water contents at very high temperatures, e.g., up to 600° C. Hence, a relative humidity of only about 5% can be operable. The interaction of water content in the steam atmosphere and glass composition allows the amount of water diffused into the glass to be carefully controlled.

Both of the processes described above recited working examples wherein an autoclave was utilized to provide the desired steam atmosphere. Such an apparatus permits the ready control of temperature and steam pressure. However, the use of an autoclave necessarily dictates a batch-type process with the concomitantly-required, batch handling equipment. Also, not only does the use of an autoclave result in the normal inefficiencies inherent in a batch process, but also leads to an uneconomical waste of energy since the high temperature and steam pressure developed within the autoclave are not utilized for any purpose other than hydrating the glass and are lost when the autoclave is opened for discharging and reloading.

Therefore, the principal objective of the instant invention is to provide an apparatus and a method for combining steam hydrating and extruding glass bodies, wherein more efficient utilization of the high temperature steam atmosphere can be had, and wherein the apparatus can be designed to permit the essentially continuous hydration and extrusion of glass bodies.

We have discovered that this objective can be attained by employing an apparatus wherein a high temperature steam atmosphere acts to both hydrate the glass bodies and extrude the hydrated material from the hydration chamber. The process permits the production of either solid hydrated extrusions or foamed hydrated bodies.

Other objectives will become apparent from the following description of the invention and a study of the appended drawings wherein:

FIGS. 1a and 1b represents an apparatus, in a most rudimentary form, suitable for the practice of the invention; and FIG. 2 is a more sophisticated apparatus capable of permitting the essentially continuous extrusion of a hydrated glass body.

In the most general terms, the process of our invention for combining hydrating and extruding glass bodies comprises four basic steps:

First, glass bodies of hereinafter-defined compositions and physical geometries are formed;

Second, these glass bodies are placed within a chamber having at least one discharge orifice and being capable of withstanding elevated temperatures and pressures;

Third, the glass bodies within the said chamber are contacted with a $H_2O$-containing environment having a relative humidity of at least 5% at a temperature above 100° C. for a sufficient length of time to hydrate at least a surface portion on the glass bodies to thereby cause an amount of water to be absorbed therein effective to impart thermoplastic behavior thereto and cause the glass bodies to coalesce together; and then Fourth, the hydrated glass is discharged under pressure through said orifice.

As is depicted in FIG. 1(A), an apparatus operable in the present invention can consist simply of a steel cylindrical chamber 1 sealed at one end and having an orifice with a removable plug 2 at the other. A disc of fine-meshed stainless steel screening 3 was pressed into the chamber at about midway therein. A pressure gauge 4 was attached to an outlet in the wall of the chamber below the screening.

In operation, water is placed in the bottom of the chamber and glass particles to be hydrated caught on screening 3 spaced apart from the water. Heating means, such as a flame burner, is applied to the chamber to cause the development of steam therein. An excess of water can be employed, thereby assuring a saturated atmosphere. Therefore, through the use of standard tables for temperature and steam pressure, it is possible to calculate the temperature inside the chamber from the steam pressure registered on gauge 4. Hydration is continued until the glass particles have absorbed such water as to coalesce into a viscous mass. At that time, the chamber is positioned as represented in FIG. 1(B) and plug 2 removed. A solid rod and/or foam will be discharged out of the orifice depending upon the rate of extrusion, temperature, pressure drop, and glass composition. One important feature of the apparatus is the absence of any moving parts inside the hydration chamber. The steam pressure acts to extrude the viscous mass. The rate of flow will be determined not only by the pressure differential between inside and outside the chamber, but also will be dependent upon such factors as the viscosity of the glass, which is a function of the water absorbed which, in turn, is a function of glass compositions, and the geometry of the discharge orifice.

Example A

Distilled water was run into the hydration chamber positioned as in FIG. 1(A) and particles −40 +140 United States Standard Sieve mesh (420–105 microns) of an anhydrous glass having the composition, in mole percent on the oxide basis, of about 17.5% $K_2O$ and 82.5% $SiO_2$ were deposited on the screening 3. The chamber was then sealed with plug 2 and a gas-fired flame applied externally to the base thereof. Sufficient heat was applied to develop a steam pressure of about 30–50 psig. After about 20 minutes at that pressure, the hydration chamber was repositioned as in FIG. 1(B) and the plug 2 removed. A mixture of solid rod and foam glass was produced having a water content of about 25% by weight.

Whereas the apparatus illustrated in FIG. 1 is intrinsically useful only as a batch operation, it eliminates much of the handling and equipment required where the conventional autoclave is employed for hydration. Furthermore, the high temperature steam pressure generated is efficiently employed for a secondary purpose rather than simply being lost to the ambient environment.

FIG. 2 sets forth an apparatus wherein an essentially continuous hydration-extrusion process can be enjoyed. As shown thereat, the apparatus consists of a steel steam generating chamber 10 and a steel hydration-extrusion chamber 11 connected through valve 12. Steam generating chamber 10 is supplied with a plug 22 at the top therein through which passes a temperature-sensing thermocouple 13. A steam pressure gauge 14 is connected to the chamber and a bleed valve 15 is also connected thereto. The hydration-extrusion chamber 11 has a ball valve 16 at the top thereof which permits the loading of material into the chamber and a plug 17 in the orifice at the base thereof. Valve 18, to permit the introduction of pressurized air or other gas, and pressure gauge 19 are connected to hydration-extrusion chamber 11. A thermocouple 20 senses the temperature within chamber 11. Each chamber is provided with heating means. As shown in FIG. 2, electrical heating bands 21 perform this function.

Example B

To begin operation, −40 +140 mesh particles of the glass described above in Example A were loaded into chamber 11 through valve 16 with plug 17 in place, and distilled water was run into chamber 10 and plug 22 inserted into place. After closing valves 12, 15, 16, and 18, heat was applied to chambers 10 and 11 such that a temperature of 110° C. was obtained in chamber 11 and 160° C. in chamber 10. A temperature of 160° C. provided a saturated steam pressure of about 100 psig. Steam was then introduced into chamber 11 through valve 12 to establish a pressure therein of 10 psig, and valve 12 then closed. After about 15 minutes, plug 17 was removed and air under pressure introduced through valve 18 to bring the total pressure with chamber 11 to 100 psig. Extrusion of a solid hydrated mass resulted having a water content of about 26% by weight.

To provide for essentially continuous extrusion, a charge of glass particles was intermittently added to chamber 11 through loading valve 16. Such additions necessitated the depressurization of chamber 11 with a consequent reduction in extrusion rates. Nevertheless, when steam was re-admitted into chamber 11 through valve 12 as described above, followed by the introduction of air, as described above, full extrusion was immediately re-established.

The use of supplemental air (or other gas) pressure permits the attainment and maintenance of the total pressure within hydration chamber 11 at any desired value for extrusion and, in so doing, renders the process essentially independent of the saturated steam pressure. This feature affords wide flexibility in establishing favorable operating conditions to achieve the type of final product desired. Hence, for example, extrusion can be conducted at a relatively low temperature such that any hazard of foaming during the extrusion of a solid body is eliminated.

Also, whereas in the above examples the hydrated glass was simply discharged out of an orifice into the ambient environment, the use of dies such as is conventional in the extrusion art to form bodies of various geometries is, of course, contemplated in the invention. Furthermore, whereas the specific apparatuses disclosed in FIGS. 1 and 2 show only a single orifice for discharging the extrudate, it will be appreciated that multiple orifices with same or different dies are also possible.

Finally, although FIGS. 1 and 2 depict apparatuses wherein the anhydrous glass particles were deposited therein in a most elementary manner such that intermittent loading of the batch was required with the concomitant necessity of depressurizing the hydration chamber, it will be recognized that there are conventional methods for loading particulate materials wherein depressurization of the hydration chamber would not be demanded. The use of a lockhopper arrangement or to pump in the batch as an aqueous slurry of glass particles are representative of such techniques.

Although each of the working examples described above utilized particles of the same glass composition, the process of the instant invention recommends itself to the broad ranges of glass compositions disclosed in U.S. application Ser. No. 445,454, supra. Thus, the operating parameters of the present invention are intrinsically sufficiently flexible to be operable with glasses within the composition field, expressed in mole percent on the oxide basis, of about 3–25% $Na_2O$ and/or $K_2O$ and 50–95% $SiO_2$, the total of those components constituting at least 55% of the composition. $Al_2O_3$, $BaO$, $B_2O_3$, $CaO$, $CdO$, $MgO$, $PbO$, $ZrO_2$, $WO_3$, $MoO_3$, $SrO$ and $ZnO$ can be included as useful additives.

Likewise, whereas a saturated steam atmosphere will normally be preferred since, in general, hydration will take place most rapidly therein, lower relative humidity environments, such as are described in U.S. Pat. Ser. No. 445,454, supra, can be successfully employed.

Further, for ease and speed of hydration and, particularly where a continuous extrusion is desired, the glass bodies to be hydrated will have cross sections not exceeding about 15 mm and, preferably, less than about 1 mm. Customarily, granules will comprise the form in which the anhydrous glass will be subjected to the steam atmosphere because of the ease with which such can be made. However, fibers, beads, ribbon, and other geometries are equally suitable so long as the thickness dimensions thereof are held below about 15 mm.

Also, whereas in the above working examples the glass granules were subjected to the hydration reaction for a sufficient length of time to cause the diffusion of water completely therethrough, such practice, though preferred, is not required. Thus, as has been explained above, the absorption of water into the glass structure imparts thermoplastic behavior thereto. Therefore, the necessary flow to permit subsequent extrusion to proceed can be achieved where only a surface layer on the glass bodies is hydrated. The resultant extrusion self-evidently would have a heterogeneous microstructure, i.e., partly anhydrous and partly hydrated. In general, however, the surface mass will uniformly be in the hydrated state.

It will be appreciated that, if desired, an auger screw, or ram, such as is employed in conventional extrusion techniques, can be utilized to supplement the force of the pressure within the hydration chamber to discharge the extrudate therefrom. Such equipment can have the virtue of mixing the hydrated glass to aid in improving homogeneity in the extruded body.

Moreover, it will be apparent that the materials utilized in the construction of any apparatus for carrying out the method of the invention, which come into contact with the $H_2O$-containing environment, must be capable of withstanding such an environment at high temperatures and pressures.

Finally, the optimum process parameters of the hydration reaction are dependent upon the composition of the glass bodies. Thus, as is explained in Ser. No. 445,454, supra, temperatures in excess of 100° C. and relative humidities in excess of 5% are demanded. However, since softening and/or melting of the parent glass bodies may not be deleterious to the purpose of this invention, the maximum hydration temperature is, in essence, dictated by the capability of the equipment employed. Hence, temperatures of 600° C. and higher can be considered. In general, however, the treatment temperature will not exceed the softening point of the anhydrous glass. The amount of water absorbed by the glass during hydration is primarily a function of glass composition, although the operating parameters of time, temperature, and pressure can also be of influence. A pressure in excess of atmospheric pressure is normally preferred to promote hydration. Commonly, the water content absorbed by the glass will vary between about 1–30% by weight, with those glasses having higher water contents being more easily hydrated and extruded.

We claim:

1. A process for combining hydrating and extruding $Na_2O$ and/or $K_2O$-$SiO_2$ glass materials which consists of the steps:
    a. forming anhydrous glass bodies having thickness dimensions not exceeding about 15 mm. and consisting essentially, in mole percent on the oxide basis, of about 3–25% $Na_2O$ and/or $K_2O$ and 50–95% $SiO_2$, the sum of those components constituting at least 55% of the total composition;
    b. placing said anhydrous glass bodies within a chamber capable of withstanding a gaseous $H_2O$-containing environment at elevated temperatures and pressures and having at least one discharge orifice;
    c. contacting said anhydrous glass bodies within said chamber with a gaseous $H_2O$-containing environment having a relative humidity of at least 5% at a temperature greater than 100° C. for a time and at a steam pressure sufficient
        I. to hydrate at least a surface portion on said glass bodies to thereby cause an amount of water to be absorbed therein effective to impart thermoplastic properties thereto and cause said hydrated glass bodies to coalesce together; and thereafter
        II. to extrude said hydrated coalesced glass under steam pressure through said discharge orifice in the form of a solid hydrated or a foamed hydrated glass body exhibiting thermoplastic properties.

* * * * *